UNITED STATES PATENT OFFICE.

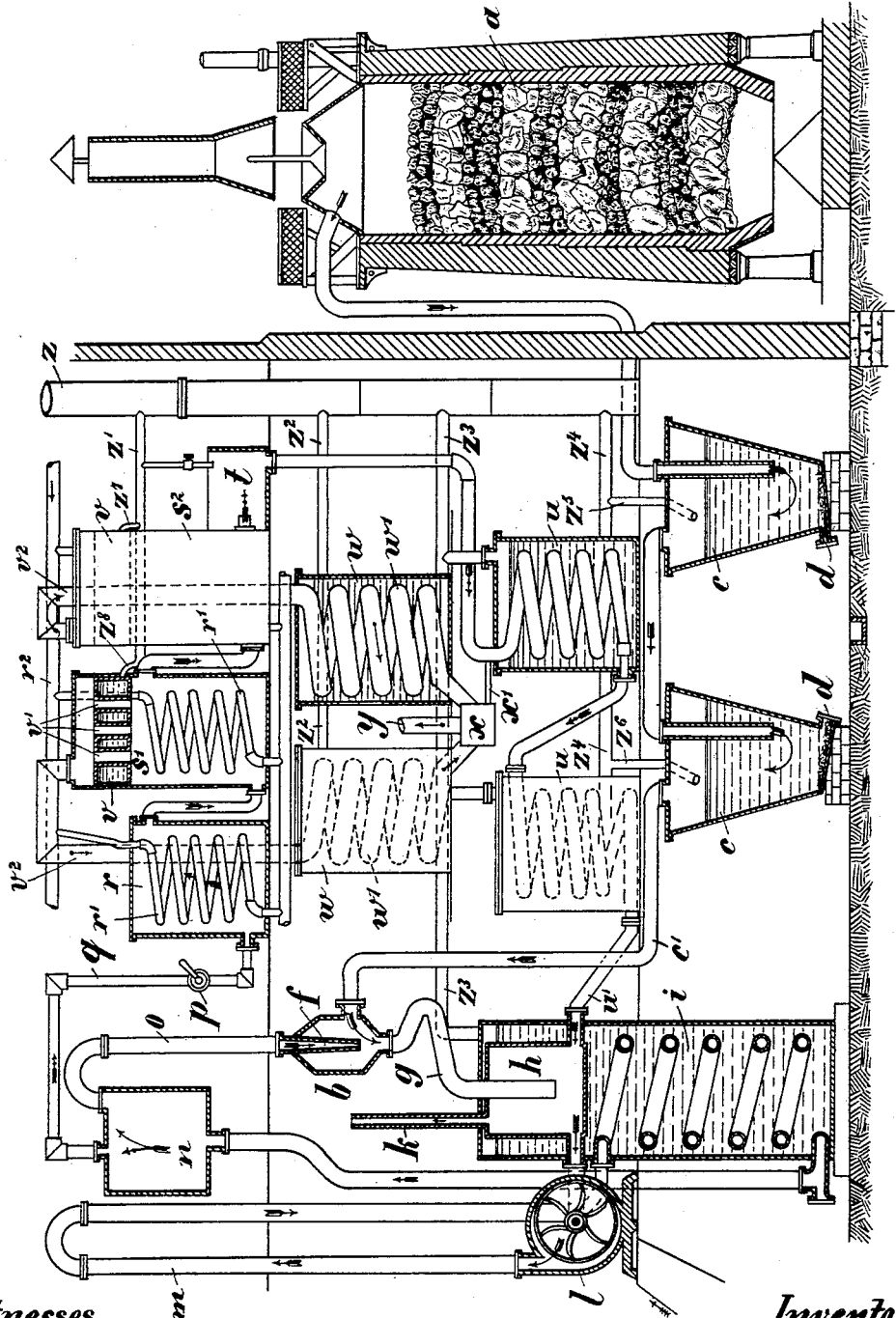

GUSTAV TRESENREUTER, OF BERLIN, GERMANY.

APPARATUS FOR PRODUCING CARBONIC ACID.

SPECIFICATION forming part of Letters Patent No. 588,037, dated August 10, 1897.

Application filed April 19, 1895. Serial No. 546,360. (No model.)

*To all whom it may concern:*

Be it known that I, GUSTAV TRESENREUTER, mechanician, of 15 Brunnenstrasse, Berlin, in the Kingdom of Prussia, German Empire, have invented new and useful Improvements in Apparatus for the Production of Carbonic Acid, of which the following is a specification.

This invention has for its object an apparatus for producing carbonic acid on a large scale from limestone. The latter is roasted in a kiln and the carbonic acid obtained, which is mixed with other gases, is brought in contact with cold solution of potassium carbonate. The solution of potassium carbonate combines completely with the carbonic acid, while the other gases mixed with it, such as carbonic oxid, nitrogen, and the like, are not absorbed and escape. The lye is then heated and thus gives off the carbonic acid absorbed, which is caught, cooled, and conveyed to the gasometer. The lye is also cooled after any losses which have taken place have been replaced and is returned to the absorption vessel. This well-known process has hitherto been carried out by the carbonic acid being mixed with the lye by means of an agitating apparatus. In such process, however, a not inconsiderable fraction of the carbonic acid remained unabsorbed and was lost. The apparatus which forms the subject of this invention removes this drawback by means of an injector through which the lye is passed several times, which injector draws up the gases from the kiln, while a part (the amount of which may be regulated) of the solution of potassium carbonate passes away, gives off the carbonic acid, and is then reconveyed to the remainder of the lye.

In the accompanying drawing is shown a sectional elevation of the apparatus by means of which the process may be carried out.

Carbonic acid is produced by roasting limestone in a shaft-furnace $a$. Alternate layers of fuel and limestone are inserted through the charging-hopper arranged at the top of the kiln and after the kiln has been brought to a state of incandescence in the usual manner it is again tightly closed. The air necessary for combustion enters from below. The carbonic acid obtained, which is diluted with carbonic oxid from the fuel, nitrogen, and, perhaps, also oxygen from the air-draft, and sometimes with other gases, as well as flue-dust and other solid impurities, is drawn off at the top of the furnace. The vacuum necessary for this is obtained by means of an injector $b$, hereinafter more particularly described. The mixture of gases first passes through one or more washing devices $c\ c$, in which the solid impurities are separated out. These washing devices are preferably conical and have their bottoms inclined to the outlets $d$, so that the mud deposited may be easily, and, if desired, continuously, removed therefrom, while the washing-water runs in at the top.

From the washers the gases reach the injector $b$ by a pipe $c'$, connecting the washing devices $c\ c$ with the injector. A stream of lye flows into this injector from the nozzle $f$ of a pipe $o$, hereinafter more particularly described, and carries the gases with it into a pipe $g$. The lye consists of a solution of potash or some other suitable substance which absorbs carbonic acid. The pipe $g$ is preferably bent several times in order to produce a thorough admixture of the gases and the liquid and opens into a chamber $h$, which lies in the upper part of a water-containing cooling-chamber $i$. There the absorption of the carbonic acid is completed, while the gases which render it impure escape through an exit $k$. The lye charged with carbonic acid flows from the chamber through a preferably bent pipe into a pump $l$.

A rotary pump is shown on the drawing, but any other suitable pump may be equally well employed. The pump $l$ forces the lye through the lifting-tube $m$, so that it is still further cooled. It then again descends, passes through a coil in the lower part of the cooling vessel $i$, and rises completely cooled into a reservoir $n$. In the latter the current divides. One part passes through the pipe $o$ back to the injector $b$ and again describes the circuit or course hereinbefore described, absorbing fresh carbonic acid. Part of the lye, however, the amount of which may be suitably regulated by the regulating-valve $p$, (say about a quarter or a half,) flows away through the pipe $q$ to a preliminary heater $r$. The carbonic acid absorbed is removed from this part of the lye. For this purpose it passes through the preliminary heater $r$ and two boilers $s'$ $s^2$, in which the lye is heated by means of steam heating-coils $r'$, leading from the steam-pipe $r^2$.

The hot lye gives off here all the carbonic acid absorbed and afterward passes into a regenerating vessel $t$, where any losses which may have taken place are made good by the addition of fresh potash, and then passes through a cooling-vat $u$, where it is cooled by means of water. The cold lye then returns to the chamber $h$ by a pipe $u'$, connecting the cooling-vat $u$ with this chamber, completing its circuit and rendering the lye therein contained capable of absorbing fresh carbonic acid. The carbonic acid obtained in the boilers $s'$ $s^2$ flows through the pipes $v'$ (which are surrounded by cooling-water) of a preliminary cooling apparatus $v$, arranged in the upper part of the boilers $s'$ $s^2$ and the pipes $v^2$, and is then thoroughly cooled down in the spiral coils $w'$ of the cooling vessels $w$. In order to remove any water of condensation contained, the carbonic acid then passes into a water-well $x$, and then flows through the pipe $y$ to the gasometer. The condensed water obtained runs, preferably through a pipe $x'$ back to the lye. It is also of practical advantage to connect all the various necessary water-pipes $z'$ $z^2$ $z^3$ $z^4$ $z^5$ $z^6$ $z^7$ $z^8$ to a water-tower $z$.

The carbonic acid may be obtained in another way—for instance, by means of chemicals—and this apparatus may be utilized therefor without essential modification.

The apparatus may also be utilized for obtaining other gases, employing, instead of the potash solution, another suitable liquid, which absorbs when cold the gas which is to be obtained and gives it off again when heated, but allows other gases, which render it impure, to escape uncombined.

Having now described my invention, what I claim, and desire to secure by Letters Patent, is—

In an apparatus for obtaining pure carbonic acid or other gases by the absorption of such gas or gases by means of a liquid which when cold absorbs the same and when heated gives it off again, but allows foreign gases to escape uncombined, the combination of an injector discharging the liquid for the absorption of the gas and producing the vacuum for drawing up the gas to be absorbed, with a chamber receiving the liquid charged with the gas drawn up by the injector and provided with an exit for the escape of the foreign gases from the said liquid, a pump leading the liquid charged with pure gas to a reservoir, means for conducting one part of the liquid charged with pure gas to the said injector and means for leading the other part to a heater for removing the gas from the other part, a vat receiving the liquid freed from gas by the said heater, means for cooling the liquid, and a pipe leading the cooled liquid freed from gas to the said chamber for the escape of the foreign gases, substantially as and for the purpose specified.

In witness whereof I have hereunto signed my name in the presence of two subscribing witnesses.

GUSTAV TRESENREUTER.

Witnesses:
WM. HAUPT,
CHAS. KRÜGER.